United States Patent
Gangadharaiah et al.

(10) Patent No.: US 9,892,193 B2
(45) Date of Patent: Feb. 13, 2018

(54) USING CONTENT FOUND IN ONLINE DISCUSSION SOURCES TO DETECT PROBLEMS AND CORRESPONDING SOLUTIONS

(71) Applicant: International Business Machines Corporation, Armonk, NY (US)

(72) Inventors: Rashmi Gangadharaiah, Bangalore (IN); Nandakishore Kambhatla, Bangalore (IN); Rose C. Kanjirathinkal, Calicut (IN); Amit Kumar R. Singh, Mumbai (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 13/848,816

(22) Filed: Mar. 22, 2013

(65) Prior Publication Data

US 2014/0289229 A1  Sep. 25, 2014

(51) Int. Cl.
*G06F 7/00* (2006.01)
*G06F 17/30* (2006.01)
(Continued)

(52) U.S. Cl.
CPC ..... *G06F 17/30749* (2013.01); *G06Q 10/101* (2013.01); *G06Q 10/20* (2013.01); *G06Q 30/016* (2013.01); *G06Q 50/01* (2013.01)

(58) Field of Classification Search
CPC .......... G06F 17/3053; G06F 17/30867; G06F 17/30864; G06F 17/30038; G06F 17/3082;
(Continued)

(56) References Cited

U.S. PATENT DOCUMENTS 6,021,411 A * 2/2000 Brophy .................... G06N 5/04
7,302,397 B1   11/2007 Hein et al.
(Continued)

OTHER PUBLICATIONS

Berger et al., "Information Retrieval as Statistical Translation" Proceedings of the 1999 ACM SIGIR Conference on Research and Development in Information Retrieval, 1999 [online], [retrieved on Jan. 24, 2013]. Retrieved from the Internet <URL: http://citeseerx.ist.psu.edu/viewdoc/download?doi=10.1.1.43.7803&rep=rep1&type=pdf>.
(Continued)

*Primary Examiner* — Heather Herndon
*Assistant Examiner* — Cecile Vo
(74) *Attorney, Agent, or Firm* — Maeve M. Carpenter (57) ABSTRACT

A method for detecting solutions to a problem using content in online discussion sources. The method includes receiving a request, such request identifying a problem, and searching multiple online discussion sources for content related to the problem. Responsive to finding content related to the problem, the method searches the multiple online discussion sources for a plurality of solutions to the problem. Responsive to finding a plurality of solutions to the problem, the method forms groups containing the solutions from each of the multiple online discussion sources. The method then determines a likeliness to solve the problem for each of the groups and ranks the groups based on the determined likeliness to solve the problem. The method then determines that the rank of at least one group meets a threshold value, wherein the threshold value is based on a confidence in the likeliness to solve the problem.

15 Claims, 3 Drawing Sheets

(51) Int. Cl.
*G06Q 30/00* (2012.01)
*G06Q 10/10* (2012.01)
*G06Q 10/00* (2012.01)
*G06Q 50/00* (2012.01)
*G06F 13/14* (2006.01)

(58) Field of Classification Search
CPC ......... G06F 17/30554; G06F 17/30598; G06F 17/30699; G06F 17/30705; G06F 17/30023; G06F 17/30; G06F 17/30011; G06F 17/30601; G06F 17/30657; G06F 17/3071; G06F 17/30943; G06F 17/30905; G06F 17/3087; G06F 17/30749; G06F 17/30761; G06F 17/30619; G06F 17/3064; G06F 17/30707; G06F 17/30861; G06F 17/3089; G06F 17/2247; G06F 17/30985; G06F 17/30766; G06F 17/30817; G06F 17/30828; G06F 17/30973; G06F 17/30616
USPC ............... 707/723, 748, 737, 754, 740, 769, 707/E17.089, E17.059, 999.003, E17.134, 707/749, 758, 999.006, E17.044, E17.014, 707/E17.061, 706, 722, 797, 707, 707/999.102; 715/708, 234, 745, 748, 715/740; 455/69, 513; 725/53; 705/14.54, 7.29
See application file for complete search history.

(56) References Cited

U.S. PATENT DOCUMENTS

| | | | |
|---|---|---|---|
| 7,590,603 B2 | 9/2009 | Zhang et al. | |
| 7,594,176 B1* | 9/2009 | English | G06F 9/4446 706/50 |
| 7,630,972 B2* | 12/2009 | Ott, IV | G06F 17/30864 |
| 8,234,231 B2 | 7/2012 | Kelly | |
| 8,543,576 B1* | 9/2013 | Buryak | G06F 17/30707 707/737 |
| 8,626,222 B2* | 1/2014 | Kotecha | H04B 7/063 370/230 |
| 8,645,358 B2* | 2/2014 | Wu | G06F 17/30867 705/14.54 |
| 8,719,706 B2* | 5/2014 | Harris | G06F 17/30861 715/708 |
| 2002/0029167 A1 | 3/2002 | Muller | |
| 2007/0294660 A1 | 12/2007 | Chong et al. | |
| 2009/0063387 A1 | 3/2009 | Beaty et al. | |
| 2010/0063797 A1* | 3/2010 | Cong | G06F 17/30734 704/9 |
| 2010/0070503 A1 | 3/2010 | Abraham | |
| 2010/0076978 A1 | 3/2010 | Cong et al. | |
| 2010/0235311 A1 | 9/2010 | Cao et al. | |
| 2011/0125697 A1 | 5/2011 | Erhart et al. | |
| 2011/0125793 A1 | 5/2011 | Erhart et al. | |
| 2012/0078891 A1 | 3/2012 | Brown et al. | |

OTHER PUBLICATIONS

Carbonell et al., "The Use of MMR, Diversity-Based Reranking for Reordering Documents and Producing Summaries" Proceedings of the 21st annual international ACM SIGIR conference on Research and development in information retrieval, 1998 [online], [retrieved on Jan. 24, 2013]. Retrieved from the Internet <URL: http://www.cs.cmu.edu/~jgc/publication/The_Use_MMR_Diversity_Based_LTMIR_1998.pdf>.

Cong et al., "Finding Question-Answer Pairs from Online Forums" In Proceedings of the 31st SIGIR, Jul. 20-24, 2008 [online], [retrieved on Jan. 24, 2013]. Retrieved from the Internet <URL: http://citeseerx.ist.psu.edu/viewdoc/download?doi=10.1.1.226.1734&rep=rep1&type=pdf>.

Hong et al., "A Classification-based Approach to Question Answering in Discussion Boards" Proceedings of the 32nd international ACM SIGIR conference on Research and development in information retrieval, 2009 [online], [retrieved on Jan. 24, 2013]. Retrieved from the Internet <URL: http://www.cse.lehigh.edu/~brian/pubs/2009/SIGIR-QA/paper.pdf>.

IBM, "A System & Method to Identify Correct Candidates for Question Answering over Structured Knowledge", Mar. 16, 2009, IP.com [online], [retrieved on Jan. 24, 2013]. Retrieved from: Prior Art Database, IP.com No. IPCOM000180748D.

Murdock et al., "Statistical Approaches to Question Answering in Watson" IBM TJ Watson Research Center [online], [retrieved on Jan. 24, 2013]. Retrieved from the Internet <URL: http://www.mathaware.org/mam/2012/pdfs/StatQA_v3.pdf>.

Raghavan et al., "Extracting Problem and Resolution Information from Online Discussion Forums" 16th International Conference on Management of Data, COMAD 2012 [online], [retrieved on Jan. 24, 2013]. Retrieved from the Internet <URL: http://www.cse.iitb.ac.in/~comad/2010/ResearchTrack/paper%206.pdf>.

Wang et al., "Segmentation of Multi-Sentence Questions: Towards Effective Question Retrieval in cQA Services" SIGIR'10, Jul. 19-23, 2010, Geneva, Switzerland, Copyright 2010 ACM.

Wei et al., "Automatic Structuring of IT Problem Ticket Data for Enhanced Problem Resolution" International Symposium on Integrated Network Management, 2007 [online], [retrieved on Jan. 24, 2013]. Retrieved from the Internet <URL: http://ieeexplore.ieee.org/stamp/stamp.jsp?tp=&arnumber=4258618>.

Xue et al., "Retrieval Models for Question and Answer Archives" SIGIR'08, Jul. 20-24, 2008, Singapore, Copyright 2008 ACM [online], [retrieved on Jan. 24, 2013]. Retrieved from the Internet <URL: http://maroo.cs.umass.edu/pdf/IR-652.pdf>.

Zhou et al., "Digesting Virtual "Geek" Culture: The Summarization of Technical Internet Relay Chats" Proceedings of the 43rd Annual Meeting of the ACL, Jul. 2005 [online], [retrieved on Jan. 24, 2013]. Retrieved from the Internet <URL: http://citeseerx.ist.psu.edu/viewdoc/download?doi=10.1.1.143.7017&rep=rep1&type=pdf>.

* cited by examiner

USING CONTENT FOUND IN ONLINE DISCUSSION SOURCES TO DETECT PROBLEMS AND CORRESPONDING SOLUTIONS

FIELD OF THE INVENTION

The present invention relates generally to the field of customer support, and more particularly to using content found in online discussion sources to detect problems and corresponding solutions.

BACKGROUND OF THE INVENTION

Online discussion sources, including online discussion forums, email correspondence and message boards, are a popular way for people to communicate using the Internet. Online discussion forums, for example, include user generated content on a specific topic, including questions, discussions, problems and corresponding solutions related to the topic. Many companies provide online discussion forums associated with their products so that users, and potentially product support staff and developers, can communicate regarding problems encountered with the product.

A user encountering a problem may visit the company's online discussion forum when a solution is not present in a product manual or elsewhere on the company's website, such as on a frequently asked questions (FAQ) webpage. The user can search existing discussion threads, and upon finding a related topic, post a new message regarding the problem. The user may also decide not to search and can instead create a new discussion thread. As a result, online discussion forums contain a large number of messages within many discussion threads that may only correspond to a relatively small number of issues, which makes it difficult to determine main issues and their solutions.

SUMMARY

Embodiments of the present invention disclose a method, computer program product, and computer system for detecting solutions to a problem using content in online discussion sources. The method includes receiving a request identifying a problem and searching multiple online discussion sources for content related to the problem. In response to finding content related to the problem, the method includes searching the multiple online discussion sources for a plurality of solutions to the problem. In response to finding a plurality of solutions to the problem in the multiple online discussion sources, the method includes grouping, by one or more computer processors, the plurality of solutions into a plurality of groups, wherein each of the plurality of groups contains at least one solution. The method then includes determining, by the one or more computer processors, a likeliness to solve the problem for each of the plurality of groups and ranking the plurality of groups based on the determined likeliness to solve the problem. The method then includes determining, by the one or more computer processors, the rank of at least one group of the plurality of groups meets a threshold value, wherein the threshold value is based on a confidence in the likeliness to solve the problem.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
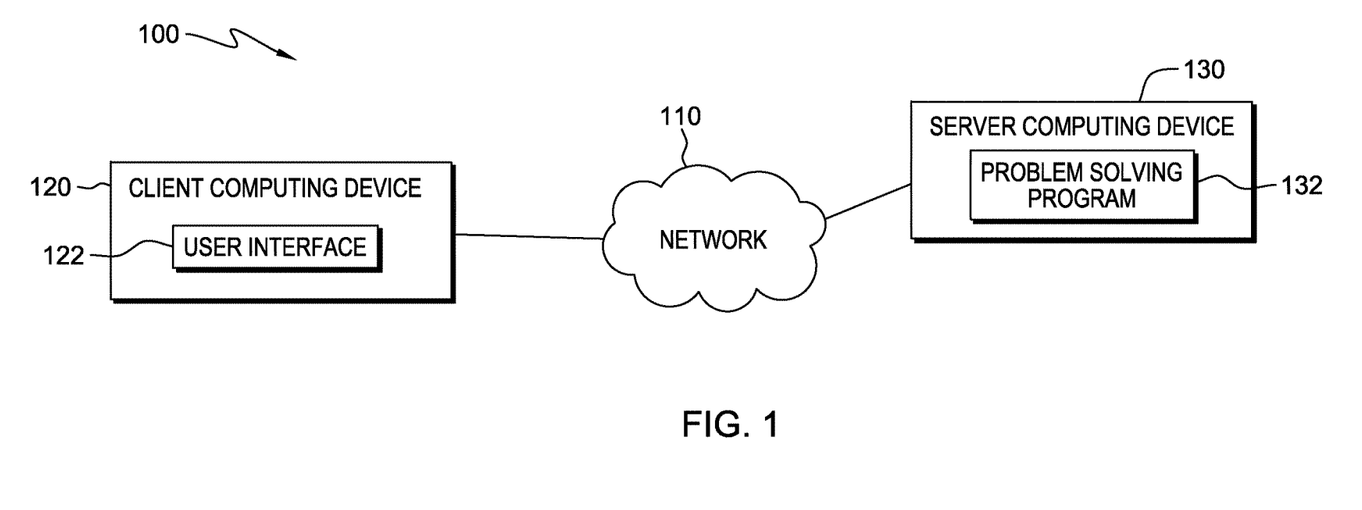
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120 and server computing device 130, all interconnected over network 110. Network 110 can be, for example, a local area network (LAN), a wide area network (WAN) such as the internet, or a combination of the two, and can include wired, wireless, or fiber optic connections. In general, network 110 can be any combination of connections and protocols that will support communications between client computing device 120 and server computing device 130.

Client computing device 120 includes user interface (UI) 122. In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 130 via network 110. UI 122 can be, for example, a graphical user interface (GUI) or a web user interface (WUI) and can display text, documents, web browser windows, user options, application interfaces and instructions for operation. Client computing device 120 can include internal and external hardware components, as depicted and described in further detail with respect to FIG. 3.

Server computing device 130 includes problem solving program 132. Server computing device 130 can be a laptop computer, tablet computer, netbook computer, PC, a desktop computer, PDA, a smart phone, or any programmable electronic device capable of communicating with client computing device 120 via network 110, and with other various components and devices within distributed data processing environment 100. In an embodiment of the present invention, server computing device 130 can represent a computing system utilizing clustered computers and components to act as a single pool of seamless resources when accessed through a network. This is a common implementation for data centers and for cloud computing applications, and can be utilized in a customer support environment, such that a technician or customer support representative receiving customer problem messages operates on server computing device 130. Server computing device 130 can include internal and external hardware components, as depicted and described in further detail with respect to FIG. 3.

Problem solving program 132 receives a description of a problem that a user has encountered with a product or service. In determining a solution to the described problem, problem solving program 132 accesses and searches discussion sources (not shown) accessible via network 110, for example, online discussion forums, for discussions or messages related to the received problem description. Online discussion sources include, in addition to online discussion forums, message or discussion boards, chat transcripts, email correspondence, or other online discussion sites where users can initiate and respond to message posts and engage in discussions. A conversation within an online discussion source is typically called a discussion thread. Online discussion sources, for example discussion forums, can be user created for a specific topic, company created for their products or services, or open to general topic discussions, such as Yahoo!® message boards.

Problem solving program 132 determines a main problem being discussed in each of the discussion threads in an online discussion source, and determines solutions associated with the main problem. The determined solutions are combined and ranked. Problem solving program 132 determines a confidence score for each solution, and if the confidence score meets a threshold value, the solution associated with the confidence score is displayed to the user. If the confidence score does not meet a threshold value, the received problem description is sent to a skilled technician for resolution.

Figure 2:
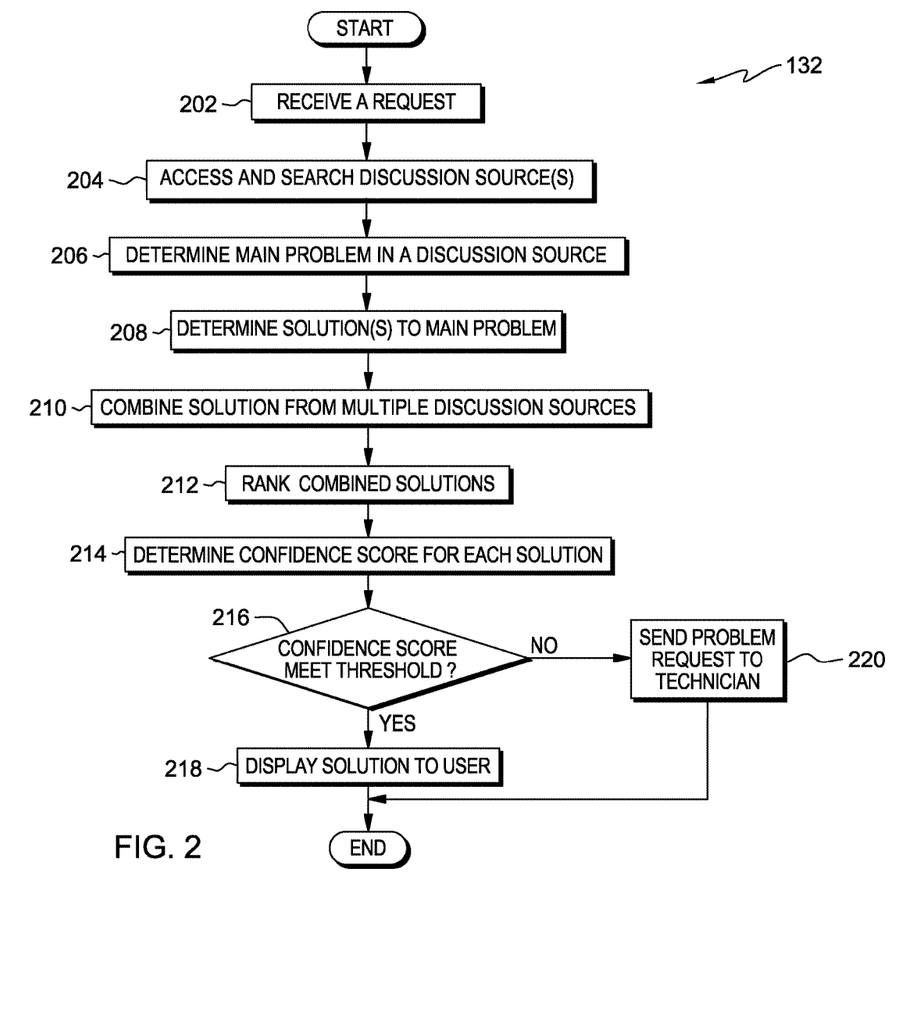
FIG. 2 is a flowchart depicting operational steps of a problem solving program for determining a main problem and associated solutions using information found in online discussion sources, in accordance with an embodiment of the present invention.

FIG. 2 is a flowchart depicting operational steps of problem solving program 132 for determining a main problem and associated solutions using information found in online discussion sources, in accordance with an embodiment of the present invention.

Problem solving program 132 receives a request from a user (step 202). The request can include a description of a problem the user is having and/or the product or service being used when the problem was encountered, for example, "my phone is not holding a charge". The request may be received in a variety of forms, for example, an email or an instant message from a user or a problem ticket sent through a company's website.

Problem solving program 132 accesses and searches discussion source(s) (step 204). Problem solving program 132 searches for the received problem on discussion sources, which can include online discussion forums, chat transcripts, email correspondence, or message boards. Typically, as soon as a product is released, problems and issues that users are having with the product are discussed in online discussion forums. Users post about a specific instance where a problem was discovered and ask if others are having the problem, or have figured out a solution. Other users can then add their experiences to the discussion thread. One discussion thread represents a conversation between one or more users regarding problems with the product, and each online discussion forum or message board can have many discussion threads about various problems users are discovering.

Problem solving program 132 determines the main problem in a discussion source (step 206). Each discussion source, either an online discussion forum, chat transcript, or a message board, can have multiple discussions occurring at any one time. Problem solving program 132 accesses each discussion source in order to obtain information about the received problem, and therefore, preferably, must determine the main problem being discussed in each discussion thread. Problem solving program 132 can identify main problems using segmentation, or any other process that divides text into coherent, meaningful units such that each unit discusses a single topic. A unit can be a grouping of text such as a word, sentence, or phrase. In an exemplary embodiment of the present invention, a discussion thread contains multiple topics and segmenting can segment the thread into units based on, for example, the topic, the author of the text, the position of the text, the content of the text or similarity with the title or the known topic of the discussion thread being examined. The units are then ranked, for example, units drawn from messages belonging to the original author of the post are more likely to concern the main problem. Additionally, units from the first post and units with similar content to other units in the discussion thread are more likely to relate to the main problem. Units with the highest ranking, as compared with other units from the discussion thread, are identified as the main problem.

Problem solving program 132 determines solution(s) to the main problem (step 208). Solutions to the main problem are identified in a similar manner as identifying the main problem, such as through segmentation processes. As the main problem is identified, the segmented units are linked to the main problem, using either the author, position, content or topic similarity of each unit. For example, solutions determined throughout a discussion thread can be linked to an identified main problem using content identified in the solution.

Problem solving program 132 combines solutions from multiple discussion sources (step 210). Multiple discussion sources can be discussing a same main problem, for example, a company's online discussion forum and a general message board, such as Yahoo!. Solutions for a same main problem are taken from each discussion source and combined, using any known clustering algorithm, such as single-link clustering or k-means clustering. In an exemplary embodiment, a clustering algorithm groups similar entities together based on the text of the entity, for example, solutions linked to a same main problem will be grouped together. Similarity between solution entities can be determined using the frequency of certain text in the solution entity.

Problem solving program 132 ranks the combined solutions (step 212). In an exemplary embodiment of the present invention, diverse solutions are extracted from combined solution groups using any diversity-based ranking algorithm. Groups of combined solutions can be measured based on diversity, which is a measure of how distinct the solutions are to enable selecting different solutions for the same problem. Another method, centrality, can be used along with diversity to ensure that representative samples are chosen from the group. In various embodiments of the present invention, a prior score for each discussion source could be used to rank the clustered solutions. For example, a higher preference can be given to a reliable chat transcript than an online discussion forum. In other embodiments, weights can be assigned to various discussion sources based on feedback from users, where users indicate which discussion sources were more useful than others.

Problem solving program 132 determines a confidence score for each solution (step 214). The confidence score for each solution is based on the relevance of the solution with respect to the main problem, which is determined from the ranked scores, and the relevance of the solutions with respect to the received problem, which can be determined by a comparison of the content or topic similarity with the received problem.

Problem solving program 132 determines whether a confidence score meets a threshold (decision block 216). In an exemplary embodiment of the present invention, the threshold can be set by the company performing the customer support operations. If a confidence score does meet the threshold (decision block 216, yes branch), the solution associated with the confidence score is displayed to the user on UI 122 (step 218). If a confidence score does not meet the threshold (decision block 216, no branch), the problem request is sent to a skilled technician for resolution (step 220).

Figure 3:
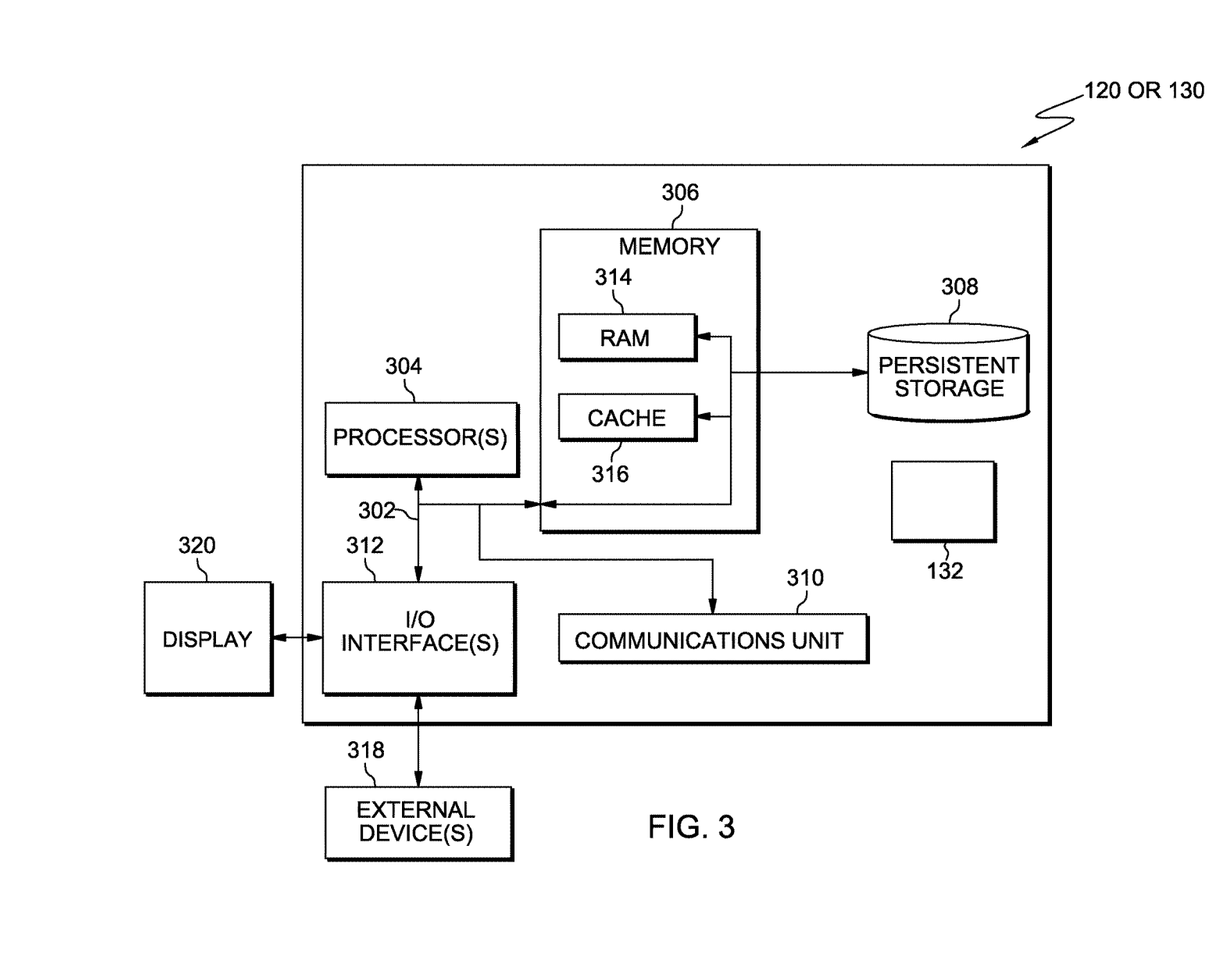
FIG. 3 depicts a block diagram of internal and external hardware components of a data processing system, such as the client computing device or server computing device of FIG. 1, in accordance with an embodiment of the present invention.

FIG. 3 depicts a block diagram of components of client computing device 120 or server computing device 130 in accordance with an illustrative embodiment of the present invention. It should be appreciated that FIG. 3 provides only an illustration of one implementation and does not imply any limitations with regard to the environments in which different embodiments can be implemented. Many modifications to the depicted environment may be made.

Client computing device 120 or server computing device 130 can include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

In an exemplary embodiment of the present invention, problem solving program 132 is stored in persistent storage 308 on server computing device 130 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including among client computing device 120 and server computing device 130. In these examples, communications unit 310 includes one or more network interface cards. Communications unit 310 can provide communications through the use of either or both physical and wireless communications links. Problem solving program 132 can be downloaded to persistent storage 308 on server computing device 130 through communications unit 310.

I/O interface(s) 312 allows for input and output of data with other devices that can be connected to either of client computing device 120 and server computing device 130. For example, I/O interface 312 can provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., problem solving program 132, can be stored on such portable computer-readable storage media and can be loaded onto persistent storage 308 via I/O interface(s) 312. I/O interface(s) 312 also connect to a display 320. Display 320 provides a mechanism to display data to a user and can be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting solutions to a problem using content in online discussion sources, the method comprising:
    receiving a request from a user, the request identifying a first problem and including at least a product being used when the first problem was encountered;
    searching multiple online discussion sources for a first content related to the first problem;
    in response to finding the first content related to the first problem, determining, by one or more computer processors, a second problem, wherein the second problem is a second content including the second problem being discussed in each of the multiple online discussion sources containing the first content related to the first problem;
    searching the multiple online discussion sources for a plurality of solutions to the second problem;
    in response to finding a plurality of solutions to the second problem in the multiple online discussion sources, grouping, by one or more computer processors, the plurality of solutions from each of the multiple online discussion sources into a plurality of groups, wherein each of the plurality of groups contains one or more solutions to the second problem;
    determining, by one or more computer processors, a confidence score for each solution of the plurality of solutions, wherein the confidence score for each solution is based on a relevance of each solution with respect to the second problem and a relevance of each solution with respect to the first problem;
    determining, by the one or more computer processors, whether the confidence score of at least one solution of the plurality of solutions meets a threshold value;
    responsive to determining the confidence score of the at least one solution meets the threshold value, displaying the at least one solution to a user; and
    ranking, by one or more computer processors, the plurality of groups, wherein the ranking is based on at least a prior score for each of the multiple online discussion sources, the prior score based on at least user feedback for each discussion source, and wherein the relevance of each solution with respect to the second problem is determined based on the ranking of the plurality of groups, and wherein the ranking is further based on at least a diversity of the plurality of solutions of a first group compared to a second group, the diversity is a measure of how distinct the solutions are to each other, in order to enable selecting different solutions for the second problem.

2. The method of claim 1, wherein said grouping, by one or more computer processors, the plurality of solutions from each of the multiple online discussion sources into a plurality of groups, wherein each of the plurality of groups contains one or more solutions to the second problem, further comprises:
    determining, by the one or more computer processors, a similarity between one or more of the plurality of solutions, wherein the determined similarity is based on a frequency of common text shared by the one or more of the plurality of solutions; and
    grouping the one or more of the plurality of solutions together based on the determined similarity.

3. The method of claim 1, wherein online discussion sources includes one or more of:
    online discussion forums, discussion boards, chat transcripts, email correspondence, or message boards.

4. The method of claim 1, wherein determining the relevance of the solution with respect to the first problem further comprises comparing a content of the solution with a content of the first problem.

5. The method of claim 1, wherein determining the second problem further comprises:
    determining, by one or more computer processors, one or more units of text, such that each unit discusses a single topic; and ranking, by one or more computer processors, the one or more units according to whether a unit relates to the second problem.

6. A computer program product for detecting solutions to a problem using content in online discussion sources, the computer program product comprising:
one or more non-transitory computer-readable tangible storage media and program instructions stored on the one or more non-transitory computer-readable tangible storage media, the program instructions comprising:
program instructions to receive a request from a user, the request identifying a first problem and including at least a product being used when the first problem was encountered;
program instructions to search multiple online discussion sources for a first content related to the first problem;
in response to finding the first content related to the first problem, program instructions to determine a second problem, wherein the second problem is a second content including the second problem being discussed in each of the multiple online discussion sources containing the first content related to the first problem;
program instructions to search the multiple online discussion sources for a plurality of solutions to the problem;
in response to finding a plurality of solutions to the problem in the multiple online discussion sources, program instructions to group the plurality of solutions from each of the multiple online discussion sources into a plurality of groups, wherein each of the plurality of groups contains one or more solutions to the second problem;
program instructions to determine a confidence score for each solution of the plurality of solutions, wherein the confidence score for each solution is based on a relevance of each solution with respect to the second problem and a relevance of each solution with respect to the first problem;
program instructions to determine whether the confidence score of at least one solution of the plurality of solutions meets a threshold value;
responsive to determining the confidence score of the at least one solution meets the threshold value, program instructions to display the at least one solution to a user; and
program instructions to rank the plurality of groups, wherein the ranking is based on at least a prior score for each of the multiple online discussion sources, the prior score based on at least user feedback for each discussion source, and wherein the relevance of each solution with respect to the second problem is determined based on the ranking of the plurality of groups, and wherein the ranking is further based on at least a diversity of the plurality of solutions of a first group compared to a second group, the diversity is a measure of how distinct the solutions are to each other, in order to enable selecting different solutions for the second problem.

7. The computer program product of claim 6, wherein said program instructions to group the plurality of solutions from each of the multiple online discussion sources into a plurality of groups, wherein each of the plurality of groups contains one or more solutions to the second problem, further comprise:
program instructions to determine a similarity between one or more of the plurality of solutions, wherein the determined similarity is based on a frequency of common text shared by the one or more of the plurality of solutions; and
program instructions to group the one or more of the plurality of solutions together based on the determined similarity.

8. The computer program product of claim 6, wherein online discussion sources include one or more of: online discussion forums, discussion boards, chat transcripts, email correspondence, or message boards.

9. The computer program product of claim 6, wherein program instructions to determine the relevance of the solution with respect to the first problem further comprise program instructions to compare a content of the solution with a content of the first problem.

10. The computer program product of claim 6, wherein the program instructions to determine the second problem further comprises:
program instructions to determine one or more units of text, such that each unit discusses a single topic; and
program instructions to rank the one or more units according to whether a unit relates to the second problem.

11. A computer system for detecting solutions to a problem using content in online discussion sources, the computer system comprising:
one or more computer processors;
one or more computer-readable tangible storage media;
program instructions stored on the one or more computer-readable tangible storage media for execution by at least one of the one or more computer processors, the program instructions comprising:
program instructions to receive a request from a user, the request identifying a first problem and including at least a product being used when the first problem was encountered;
program instructions to search multiple online discussion sources for a first content related to the first problem;
in response to finding the first content related to the first problem, program instructions to determine a second problem, wherein the second problem is a second content including the second problem being discussed in each of the multiple online discussion sources containing the first content related to the first problem;
program instructions to search the multiple online discussion sources for a plurality of solutions to the problem;
in response to finding a plurality of solutions to the problem in the multiple online discussion sources, program instructions to group the plurality of solutions from each of the multiple online discussion sources into a plurality of groups, wherein each of the plurality of groups contains one or more solutions to the second problem;
program instructions to determine a confidence score for each solution of the plurality of solutions, wherein the confidence score for each solution is based on a relevance of each solution with respect to the second problem and a relevance of each solution with respect to the first problem;
program instructions to determine whether the confidence score of at least one solution of the plurality of solutions meets a threshold value;
responsive to determining the confidence score of the at least one solution meets the threshold value, program instructions to display the at least one solution to a user; and
program instructions to rank the plurality of groups, wherein the ranking is based on at least a prior score for each of the multiple online discussion sources, the prior score based on at least user feedback for each discussion source, and wherein the relevance of each solution with respect to the second problem is determined based on the ranking of the plurality of groups, and wherein the ranking is further based on at least a diversity of the plurality of solutions of a first group compared to a second group, the diversity is a measure of how distinct the solutions are to each other, in order to enable selecting different solutions for the second problem.

12. The computer system of claim 11, wherein said program instructions to group the plurality of solutions from each of the multiple online discussion sources into a plurality of groups, wherein each of the plurality of groups contains one or more solutions to the second problem, further comprise:

program instructions to determine a similarity between one or more of the plurality of solutions, wherein the determined similarity is based on a frequency of common text shared by the one or more of the plurality of solutions; and program instructions to group the one or more of the plurality of solutions together based on the determined similarity.

13. The computer system of claim 11, wherein online discussion sources include one or more of: online discussion forums, discussion boards, chat transcripts, email correspondence, or message boards.

14. The computer system of claim 11, wherein program instructions to determine the relevance of the solution with respect to the first problem further comprise program instructions to compare a content of the solution with a content of the first problem.

15. The computer system of claim 11, wherein the program instructions to determine the second problem further comprises:

program instructions to determine one or more units of text, such that each unit discusses a single topic; and
program instructions to rank the one or more units according to whether a unit relates to the second problem.

* * * * *